United States Patent [19]
Tuttle et al.

[11] Patent Number: 6,081,047
[45] Date of Patent: Jun. 27, 2000

[54] APPARATUS AND METHOD OF RESETTING AN ELECTRIC DEVICE

[75] Inventors: Mark E. Tuttle, Boise; Scott T. Trosper, Meridian, both of Id.

[73] Assignee: Micron Technology, Inc., Boise, Id.

[21] Appl. No.: 08/969,626

[22] Filed: Nov. 13, 1997

[51] Int. Cl.[7] .................................................. H02B 1/00
[52] U.S. Cl. ........................................ 307/125; 307/150
[58] Field of Search .................................. 307/112, 116, 307/125, 126, 130, 131, 139, 140, 141.1, 150; 323/265, 271, 273, 274, 283, 284; 327/419; 395/750.01, 750.02; 713/300, 310

[56] References Cited

U.S. PATENT DOCUMENTS

| | | | |
|---|---|---|---|
| 4,075,632 | 2/1978 | Baldwin et al. | 343/6.8 R |
| 4,926,182 | 5/1990 | Ohta et al. | 342/44 |
| 5,027,328 | 6/1991 | Nakashima | 365/226 |
| 5,215,121 | 6/1993 | Knodle et al. | 363/98 |
| 5,355,293 | 10/1994 | Carlstedt | 363/17 |
| 5,621,412 | 4/1997 | Sharpe et al. | 342/51 |
| 5,649,296 | 7/1997 | MacLellon et al. | 455/38.2 |
| 5,650,924 | 7/1997 | Huh | 363/127 |
| 5,655,561 | 8/1997 | Wendel et al. | 137/79 |
| 5,842,118 | 11/1998 | Wood, Jr. | 455/101 |
| 5,963,177 | 10/1999 | Tuttle et al. | 343/872 |

*Primary Examiner*—Fritz Fleming
*Attorney, Agent, or Firm*—Well, St. Johns, Roberts, Gregory & Matkins P.S.

[57] ABSTRACT

The present invention provides an apparatus and method of resetting an electric device. One method according to the present invention includes providing an electrical device including a power supply and an electrical component; providing an interconnect; electrically coupling the power supply and the electrical component using the interconnect; shorting the power supply of the electrical device following the coupling; removing the short; and applying power from the power supply to the electrical component via the interconnect. Another method according to the present invention includes providing a substrate; supporting a power supply using the substrate; supporting an electrical component using the substrate; coupling the power supply and the electrical component using an interconnect; temporarily shorting the power supply; and applying power via the interconnect to the electrical component using the power supply.

57 Claims, 7 Drawing Sheets

APPARATUS AND METHOD OF RESETTING AN ELECTRIC DEVICE

TECHNICAL FIELD

The present invention relates to an apparatus and method of resetting an electric device.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application and incorporated herein by reference. This application discloses the use of a radio frequency (RF) communication system including communication devices. The disclosed communication devices include an interrogator and a transponder, such as a tag or card.

Such communication systems can be used in various identification functions and other applications. The interrogator is configured to output a polling signal which may comprise a radio frequency signal including a predefined code. The transponders of such a communication system are operable to transmit an identification signal responsive to receiving an appropriate command or polling signal. More specifically, the appropriate transponders are configured to recognize the predefined code. The transponders receiving the code subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is attached to an object of interest. Responsive to receiving the appropriate polling signal, the identification device is equipped to output an identification signal. Generating the identification signal identifies the presence or location of the identification device and the article or object attached thereto.

Some electronic and communication devices utilize a conductive adhesive or epoxy for attachment of circuit or electrical components to conductive patterns or traces upon a base substrate of the communication device. The epoxy is applied by conventional techniques, such as stencil printing, and thereafter the electrical component is placed in contact with the epoxy. The epoxy is thereafter cured over a sufficient period of time. Such curing renders the epoxy conductive providing electrical coupling of the electrical component with the conductive trace.

It has been observed that certain epoxies gradually become conductive over a period of time during cure. Slow curing of the epoxy may cause electrical circuitry within the electronic device to latch-up such that it does not properly function. Latching-up of the component circuitry is a result of the epoxy being only partially conductive during cure.

Therefore, there exists a need to provide component attachment using conductive adhesive or epoxy while alleviating problems typically associated therewith.

SUMMARY OF THE INVENTION

According to a first aspect, the present invention provides an apparatus configured to reset an electrical device having a power supply. The apparatus includes plural electrodes configured for electrical engagement with plural terminals of a power supply of the electrical device. A switch is provided which has plural power terminals and a control terminal. The power terminals are electrically coupled with the electrodes and the control terminal is operable to receive a control signal. The switch is configured to electrically connect the power terminals and short the power supply responsive to the control signal. The apparatus also includes a controller configured to generate the control signal and apply the control signal to the switch. Preferred embodiments include an indicator to indicate shorting of the power supply.

The present invention provides a method of resetting an electrical device in a next aspect of the present invention. The method includes providing an electrical device including a power supply, an electrical component and an interconnect. The method also includes electrically coupling the power supply and the electrical component using the interconnect and shorting the power supply of the electrical device following the coupling. The short is removed and thereafter power is applied from the power supply to the electrical component via the interconnect.

Another method of forming an electrical device in accordance with the present invention includes providing a substrate and supporting a power supply and electrical component using the substrate. This method also includes coupling the power supply and the electrical component using an interconnect, temporarily shorting the power supply and applying power via the interconnect to the electrical component using the power supply.

The present invention also discloses another method of forming an electrical device. The method according to this aspect of the subject invention includes supporting a power supply using a substrate and coupling an electrical component with the power supply using an adhesive. The method further provides curing the adhesive, shorting the power supply, and conducting electricity using the cured adhesive after the shorting.

According to another aspect, the present invention provides a method of forming a remote intelligent communication device. This method includes forming a conductive pattern upon a substrate and electrically coupling an integrated circuit with the conductive pattern. The method further provides electrically coupling a power supply having a power terminal and a ground terminal with the conductive pattern and electrically coupling a reset device with the power terminal and the ground terminal of the power supply. Next, the power terminal and the ground terminal of the power supply are shorted using the reset device and electricity is applied to the integrated circuit following the shorting.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention provides an apparatus configured to reset or re-initialize an electrical device. In one embodiment, the disclosed apparatus is configured to momentarily short a power supply of the electronic device, thereby resetting the electrical device. The shorting is responsive to a coupling of the reset apparatus with the power supply. The apparatus of the present invention may be utilized in other applications and with electronic devices having different configurations. According to additional aspects of the present invention, methods of resetting and forming electrical devices including remote intelligent communication devices are also provided.

The operation of the present invention is described herein with reference to electronic communication devices. However, the present invention is not limited to such applications. The electronic communication devices described herein include various forms of housings. The embodiments are illustrative and other configurations are possible. Certain embodiments of the electronic communication devices comprise radio frequency identification devices (RFID) and remote intelligent communication devices (RIC). Remote intelligent communication devices are capable of functions other than the identifying function of radio frequency identification devices.

Figure 1:
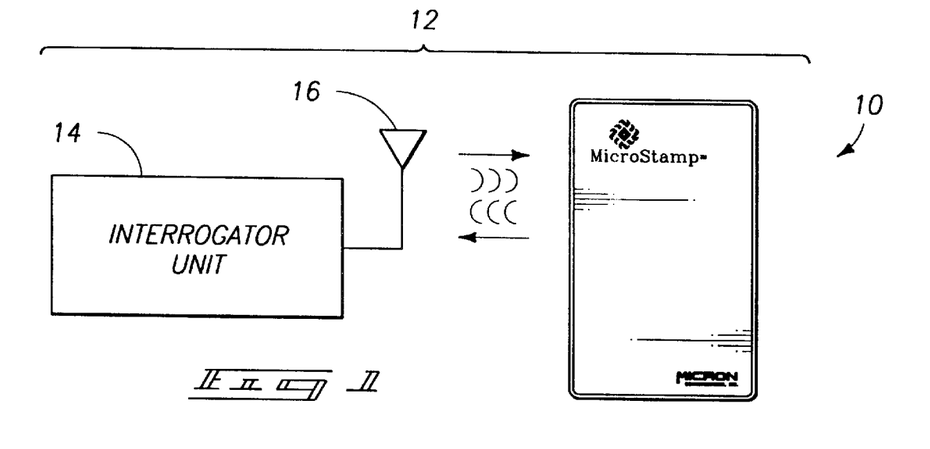
FIG. 1 is an illustrative diagram of one embodiment of a communications system comprising plural electronic devices.

Referring to FIG. 1, an electronic device 10, such as a remote intelligent communication device or electronic communication device, comprises part of a communication system 12. The communication system 12 shown in FIG. 1 further includes an interrogator unit 14. An exemplary interrogator 14 is described in detail in U.S. patent application Ser. No. 08/806,158, filed Feb. 25, 1997, assigned to the assignee of the present application and incorporated herein by reference. The electronic device 10 communicates via electromagnetic signals, such as radio frequency (RF) signals, with the interrogator unit 14. Electromagnetic signals or radio frequency signals including microwave signals are utilized for communications in a preferred embodiment of communication system 12.

The communication system 12 further includes an antenna 16 coupled to the interrogator unit 14. An exemplary radio frequency communication system is described in U.S. patent application Ser. No. 08/705,043, which was incorporated above.

Figure 2:
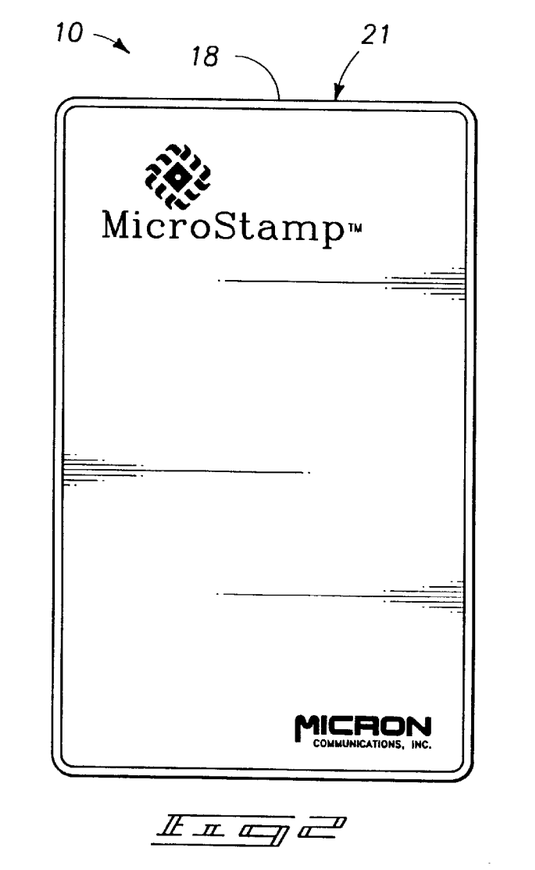
FIG. 2 is a front elevational view of an embodiment of an electronic device of the communication system.

Referring to FIG. 2, the electronic device 10 includes an insulative substrate or layer of supportive material 18. The term "substrate" as used herein refers to any supporting or supportive structure, including but not limited to, a supportive single layer of material or multiple layer constructions which may be flexible. Example materials for the substrate 18 comprise polyester, polyethylene or polyimide film having a thickness of 4–6 mils (thousandths of an inch). A plurality of ink layers (not shown) are applied to substrate 18 in other embodiments of the invention. Substrate 18 provides an outer periphery 21 of device 10. The substrate 18 defines a first portion of a housing for the electronic device 10.

Figure 3:
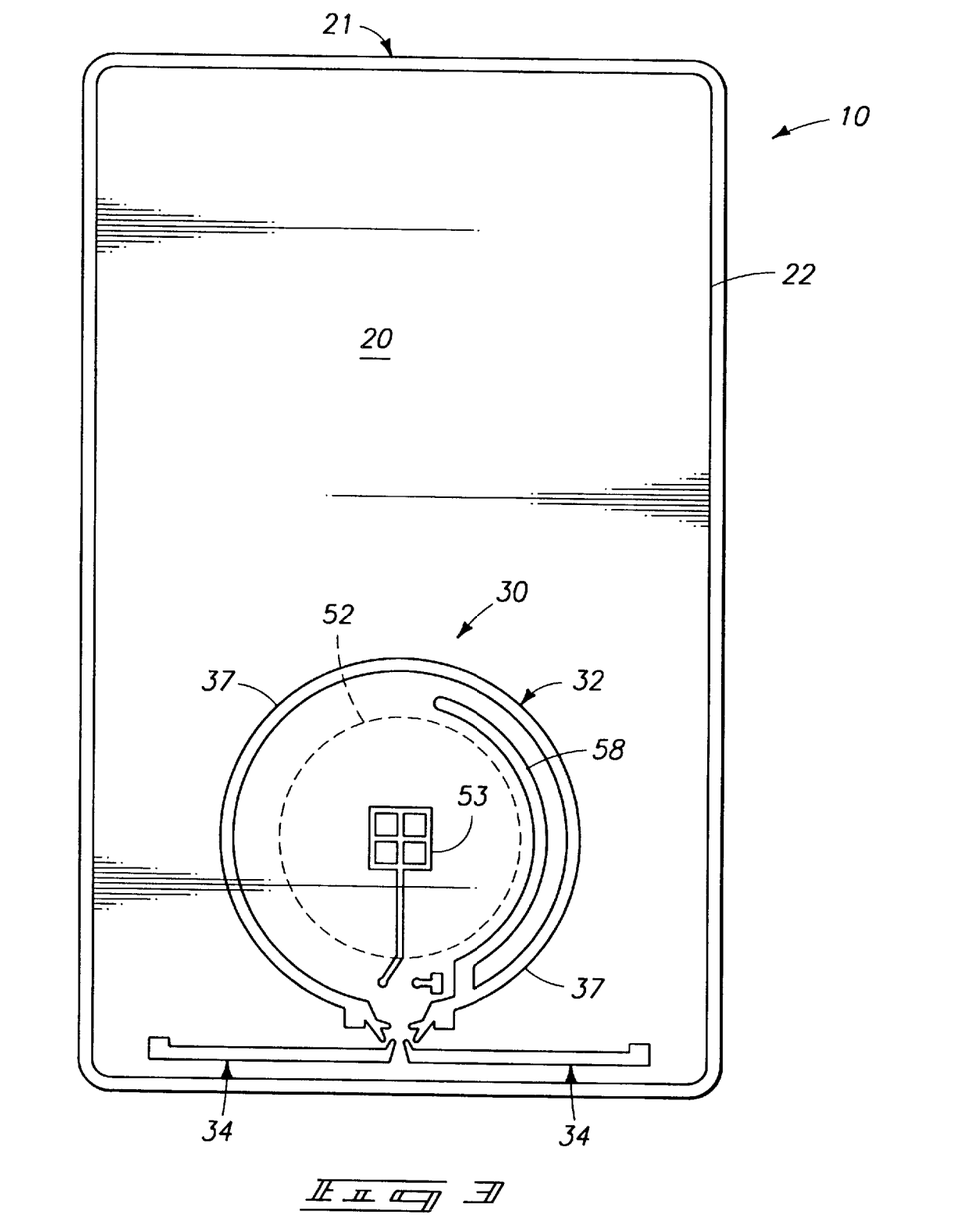
FIG. 3 is a front elevational view of the electronic device at an intermediate processing step.

Referring to FIG. 3, intermediate processing of electronic device 10 is described. Substrate 18 includes a support surface 20. A patterned conductive trace 30 is formed or applied over the substrate 18 directly atop the support surface 20 in the described embodiment.

A preferred conductive trace 30 comprises silver ink or polymer thick film (PTF). One manner of forming or applying the conductive ink is to screen or stencil print the ink on the support surface 20 through conventional screen printing techniques. The conductive ink forms desired electrical connections with and between electronic components which will be described below.

The illustrated conductive trace 30 further provides antennas 32, 34 which are suitable for transmitting and receiving electromagnetic signals or RF energy. Other antenna constructions of antennas 32, 34 are possible.

Conductive trace 30 additionally includes a plurality of interconnections or power source terminals, including a first connection terminal 53 and a second connection terminal 58. Terminals 53, 58 are formed on support surface 20 of device 10. One embodiment of an electronic device 10 provides a power source 52 (shown in phantom in FIG. 3). Power source 52 is disposed within antenna 32 in one embodiment of electronic device 10.

Figure 4:
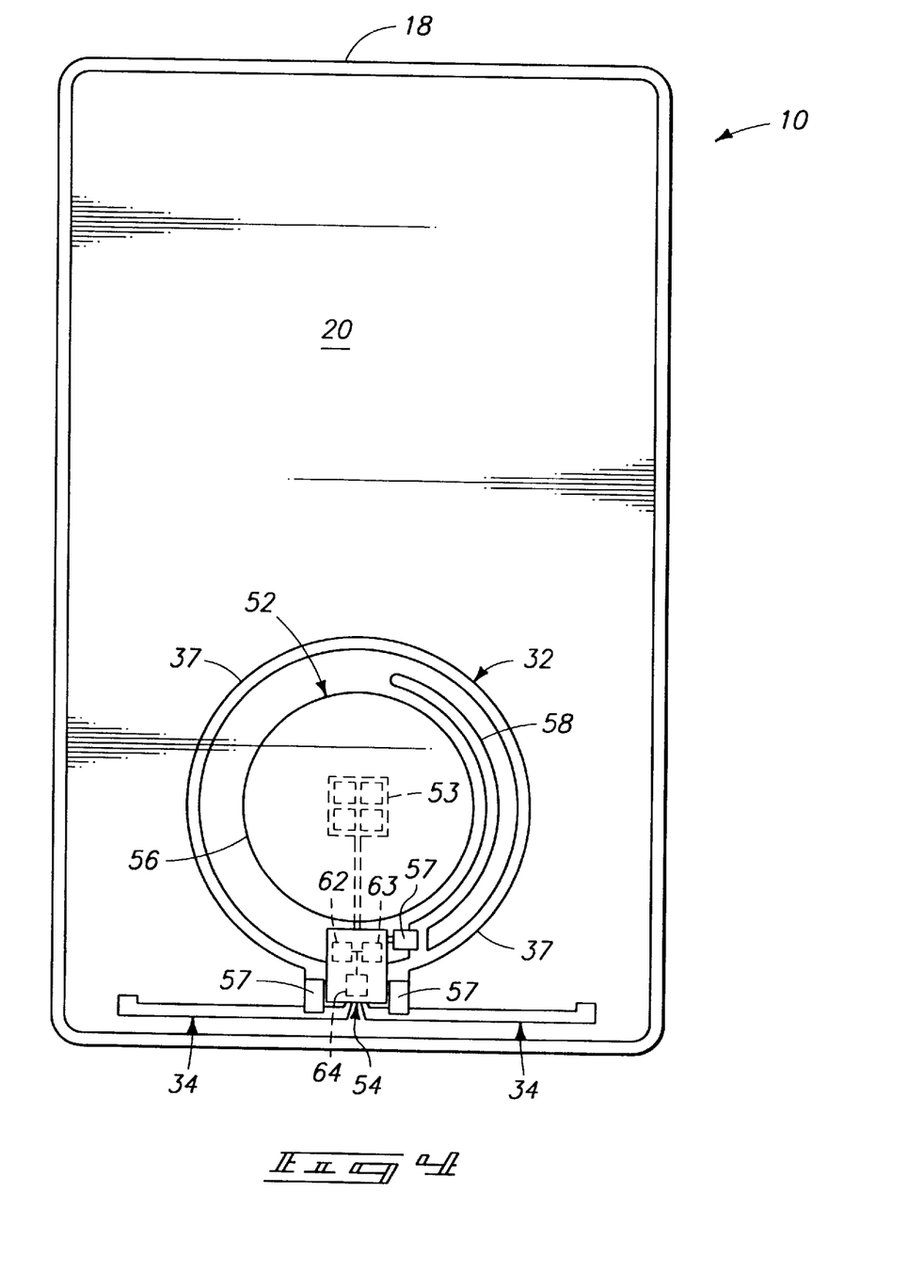
FIG. 4 is a front elevational view of the electronic device at an intermediate processing step downstream of the step shown in FIG. 3.

Referring to FIG. 4, electrical components, such as power source 52 and an integrated circuit 54, are provided and mounted on support surface 20 and supported by substrate 18. Other components including capacitors 57 are mounted on surface 20 in the depicted embodiment. Power source 52 provides operational power to selected electronic components of the electronic device 10, including integrated circuit 54.

Integrated circuit 54 includes suitable circuitry for providing wireless communication operations in the described embodiment of the invention. For example, in one embodiment, integrated circuit 54 includes a processor 62, memory 63, and transponder circuitry 64 for providing wireless communications with interrogator unit 14. An exemplary and preferred integrated circuit 54 is described in U.S. patent application Ser. No. 08/705,043 incorporated by reference above.

Transponder circuitry 64 includes a modulator and a receiver. The receiver is configured to receive electromagnetic signals and the modulator is configured to output or communicate electromagnetic signals. The modulator comprises an active transmitter or a backscatter device according to certain embodiments of the present invention. Such outputting or communicating of the electromagnetic signal via the modulator comprises one of transmitting the electromagnetic signal and reflecting a received signal in the described embodiments.

When configured as an active transmitter, the modulator of transponder circuitry 64 is operable to transmit an electromagnetic signal such as a identification signal responsive to the receiver receiving a polling signal. Processor 62 is configured to process the polling signal to detect a predefined code within the polling signal. Responsive to detection of an appropriate polling signal, processor 62 instructs transponder circuitry 64 to output or communicate an identification signal. The identification signal contains an appropriate code to identify the particular device 10 transmitting the identification signal.

Alternatively, when embodied as a backscatter device, the modulator of transponder circuitry 64 operates to selectively reflect a received electromagnetic signal following processing of the signal within processor 62. The reflected signal also serves to identify the particular device 10 communicating the reflected signal.

In the illustrated embodiment, power source 52 is a battery. The battery is preferably a thin profile battery which includes first and second terminals of opposite polarity. More particularly, the battery has a lid or negative (i.e., ground) terminal or electrode, and a can or positive (i.e., power) terminal or electrode. Plural power sources are provided in other embodiments of the invention.

A conductive adhesive, such as conductive epoxy, is applied over desired areas of the support surface 20 using conventional printing techniques, such as stencil printing, to assist in component attachment described just below. Alternately, solder or another conductive material is employed instead of conductive epoxy. The power source 52 is provided and mounted on support surface 20 using the conductive epoxy. Integrated circuit 54 is also provided and mounted or conductively bonded on the support surface 20 using the conductive epoxy. Integrated circuit 54 can be mounted either before or after the power source 52 is mounted on the support surface 20. The conductive epoxy provides interconnects to electrically couple integrated circuit 54 and power source 52 with conductive trace 30.

More specifically, first and second connection terminals 53, 58 are coupled to the integrated circuit 54 by conductive epoxy in accordance with a preferred embodiment of the invention. In addition, conductive epoxy electrically connects the first terminal of the power source 52 to the first connection terminal 53 (shown in phantom in FIG. 4). In the illustrated embodiment, power source 52 is placed lid down such that the conductive epoxy makes electrical contact between the negative terminal of the power source 52 and the first connection terminal 53.

Power source 52 has a perimetral edge 56, defining the second power source terminal, which is disposed adjacent second connection terminal 58. In the illustrated embodiment, perimetral edge 56 of the power source 52 is cylindrical, and the connection terminal 58 is arcuate and has a radius slightly greater than the radius of the power source 52, so that connection terminal 58 is closely spaced apart from the edge 56 of power source 52.

Subsequently, conductive epoxy is dispensed relative to perimetral edge 56 and electrically connects perimetral edge 56 with connection terminal 58. In the illustrated embodiment, perimetral edge 56 defines the can of the power source 52, such that the conductive epoxy connects the positive terminal of the power source 52 to connection terminal 58. The conductive epoxy is then cured providing conductive interconnects of power source 52 and integrated circuitry 54 with conductive pattern 30.

The present invention provides an apparatus and methods of resetting or re-initializing the electronic device 10 and integrated circuit 54. Such resetting is preferably provided following attachment of the electrical components and subsequent curing of the epoxy. Resetting or re-initialization of electronic device 10 provides a controlled power-up condition of device 10. Such resetting cures latch-up problems of integrated circuit 54 which may occur during the fabrication of electronic device 10. In the described embodiment, the resetting follows the curing of the conductive adhesive or epoxy which renders such adhesive or epoxy conductive.

Figure 5:
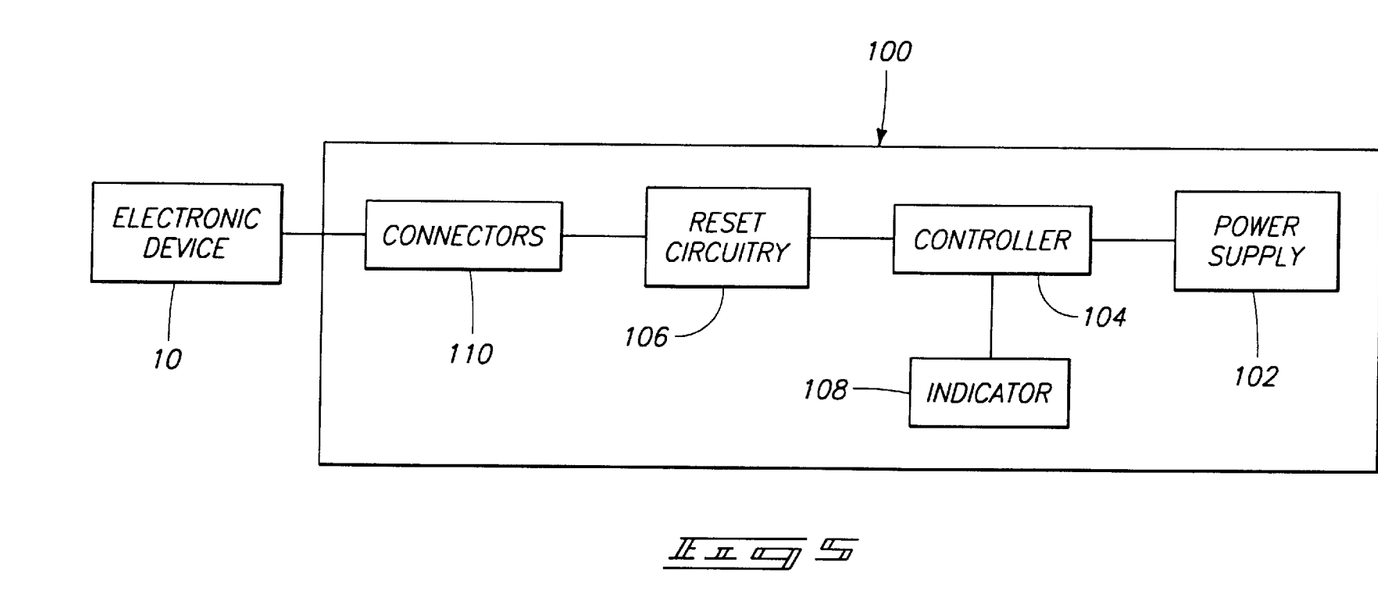
FIG. 5 is a functional block diagram of one embodiment of a reset apparatus in accordance with the present invention.

Referring to FIG. 5, one embodiment of a reset device or apparatus 100 in accordance with the present invention is shown. The depicted reset apparatus 100 operates as an external shorting circuit configured to pull the power supply 52 of electronic device 10 low and control the rise time as it ramps high. Following establishment of a stable condition within electronic device 10, reset apparatus 100 may be disconnected from device 10. Reset apparatus 100 comprises an internal power supply 102, controller 104, reset circuitry 106, indicator 108 and connection or connectors 110 in the illustrated embodiment.

Power supply 102 is configured to provide DC power to selected components of the reset or test apparatus 100. Controller 104 is configured to generate control signals for operating apparatus 100. Controller 104 is operable to control reset circuitry 106 and the resetting or re-initializing of electronic device 10 coupled with connectors 110 of reset apparatus 100. Reset circuitry 106 comprises a switch having plural power terminals and a control terminal in the described embodiment. Reset circuitry 106 is configured to receive control signals from controller 104 and reset electronic device 10 via connection 110 responsive to the control signals.

Connectors 110 are operable to provide a removable electrical coupling of electronic device 10 with reset apparatus 100 and reset circuitry 106 in one embodiment of the invention. In the described embodiment, connectors 110 comprise plural electrodes configured for electrical engagement with plural terminals of the power supply 52 of electronic device 10. Connectors 110 comprise spring-loaded electrodes, also referred to as pogo pins, in one embodiment.

The illustrated embodiment of apparatus 100 includes at least one indicator 108 operable to generate an audio and/or visual indication responsive to resetting or shorting of electronic device 10. In embodiments where resetting operations are automatically administered, indicator 108 is operable to generate an output signal indicating the administration of a reset pulse to electronic device 10. The output signal is applied to automated test equipment utilized in such embodiments.

Figure 6:
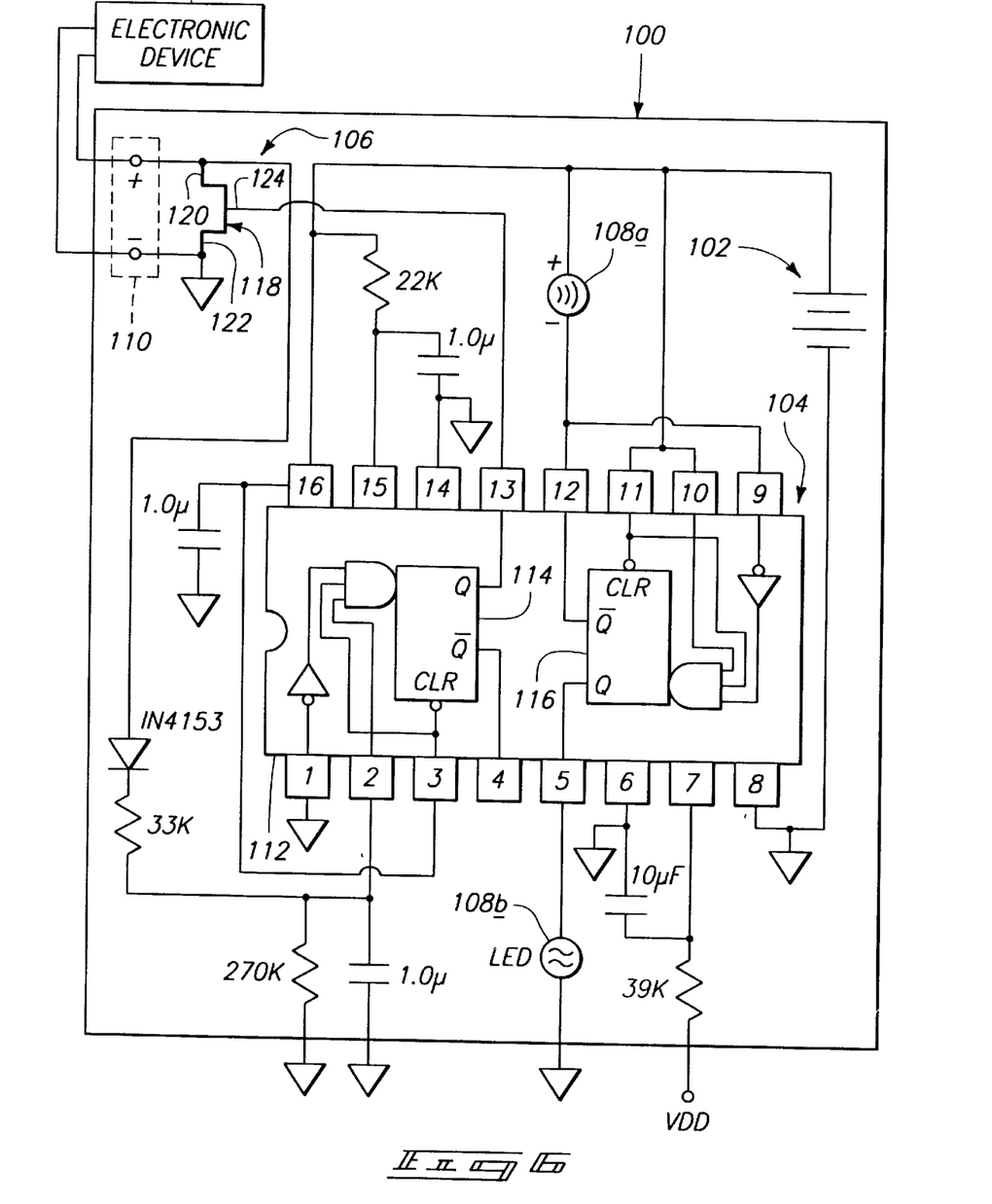
FIG. 6 is a schematic diagram of the reset apparatus shown in FIG. 5.

Referring to FIG. 6, components according to one embodiment of apparatus 100 are shown in detail. The illustrated apparatus 100 includes power supply 102, controller 104, reset circuitry 106, plural indicators 108a, 108b and connectors 110.

Power supply 102 is implemented by two batteries connected in series in the described embodiment. Suitable batteries have designation 2016 and are available from Eveready Battery Company, Inc. Such 2016 batteries are sufficient to accommodate a 0.25 mA current drain of reset apparatus 100 for approximately 250 hours.

Power supply 102 provides operational power to controller 104. In the depicted embodiment, controller 104 comprises an integrated circuit 112 having designation 74HCT123. The integrated circuit 112 includes plural multivibrators 114, 116, also referred to as one-shots. First multivibrator 114 is configured to control the operation of reset circuitry 106. Second multivibrator 116 is configured to output indication signals to indicators 108a, 108b corresponding to the administration of a reset pulse to electronic device 10.

Reset circuitry 106 comprises a switch 118 in the described embodiment. The illustrated switch 118 is implemented as a power transistor having designation 276-2072A available from Radio Shack, a division of Tandy Corporation. Transistor 118 comprises plural power terminals 120, 122 and a control terminal 124.

Power terminals 120, 122 are configured for attachment to the power supply 52 of electronic device 10 via connectors 110. First power terminal 120 is configured for attachment to a positive terminal of the power supply 52 of electronic device 10 and second power terminal 122 is configured for attachment to the negative terminal of the power supply 52 of electronic device 10. Control terminal 124 is coupled with an output (Q output corresponding to pin 13) of first multivibrator 114.

Responsive to the electrical coupling of power supply 52 of electronic device 10 with connectors 110, reset apparatus 100 is preferably triggered once. In the described embodiment of apparatus 100, a rising edge is applied to an input of first multivibrator 114. The Q output of first multivibrator 114 goes high responsive to receiving power from power supply 52 of electronic device 10. The output of first multivibrator 114 is applied to the control terminal 124 of transistor 118 and controls transistor 118 operation. Application of a logic high signal from first multivibrator 114 to control terminal 124 electrically connects the power terminals 120, 122 and shorts power supply 52. Shorting power supply 52 provides controlled resetting or re-initialization of the electronic device 10 coupled with apparatus 100.

In addition, the output of first multivibrator 114 is applied to an input of second multivibrator 116 in the described embodiment of apparatus 100. Responsive to receiving the logic high output from first multivibrator 114, second multivibrator 116 applies a logic low signal (Q not output corresponding to pin 12) to a first indicator 108*a* and a logic high signal (Q output corresponding to pin 5) to a second indicator 108*b*. A suitable first indicator 108*a* is an audio buzzer having designation 273-074A available from Radio Shack, a division of Tandy Corporation. Buzzer 108*a* provides an audio indication of the application of the reset pulse to electronic device 10. A suitable second indicator 108*b* is a light emitting diode (LED) to provide visual indication of the application of the reset pulse to electronic device 10.

Figure 7:
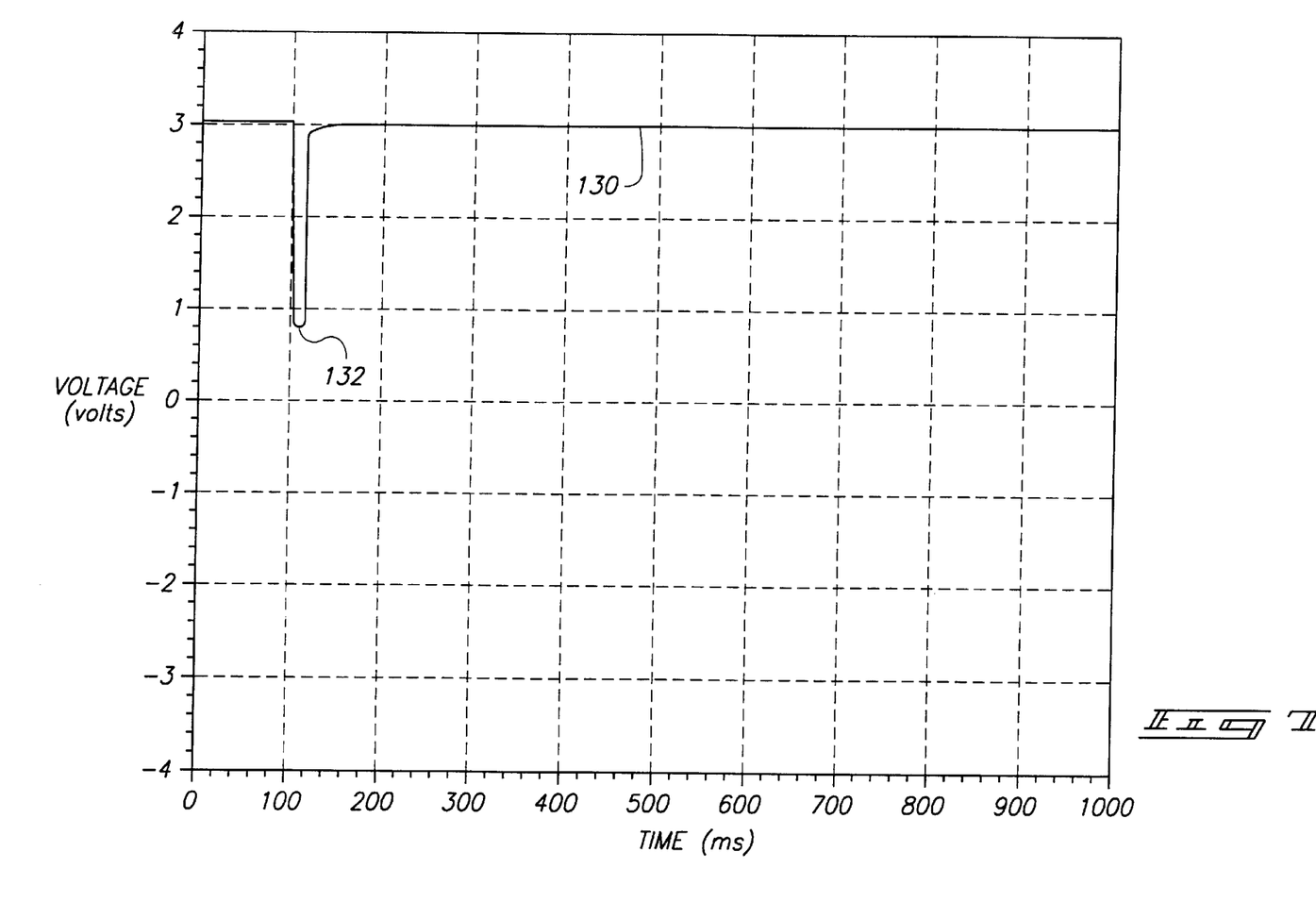
FIG. 7 is a graphical representation of the voltage of a power supply of the electronic device.

Referring to FIG. 7, a graphical representation of the reset pulse and controlled application thereof to electronic device 10 is shown. Line 130 represents the voltage at first power terminal 120 from power source 52 as a function of time. Initially, the voltage received at the positive terminal 120 is approximately three volts, as represented by line 130, following attachment of electronic device 10 with connectors 110 of the test or reset apparatus 100.

Following attachment of electronic device 10 and the subsequent assertion of the control signal from controller 104 responsive thereto, reset circuitry 106 shorts power supply 52 of electronic device 10 as indicated at position 132 of line 130 on the illustrated graph. The power supply 52 of electronic device 10 is dropped to approximately 0.8 volts for a selected period of time, or approximately 10 milliseconds (ms) at position 132.

Thereafter, first multivibrator 114 outputs a logic low control signal to reset circuitry 106 and the gate or control terminal 124 of power transistor 118 therein. The application of the logic low signal to the control terminal 124 opens the electrical connection between power terminals 120, 122 of transistor 118.

The voltage at terminal 120 ramps high to approximately three volts as represented by line 130 following the opening of the electrical connection intermediate power terminals 120, 122. The power supply voltage of electronic device 10 recovers quickly providing a controlled step-up in voltage and controlled resetting or re-initializing of electronic device 10. Thereafter, electronic device 10 is operational and subsequent processing and fabrication of electronic device 10 is continued.

Discrete components (e.g., resistors, capacitors) having preselected values may be utilized to control the length of time of the shorting of power supply 52 of electronic device 10 (corresponding to position 132 of the graph of FIG. 7). Varying the values of the discrete components coupled with first multivibrator 114 varies the length of time of the shorting of power supply 52. Varying the values of the discrete components coupled with second multivibrator 116 varies the length of time of the generation of the indication signal.

Figure 8:
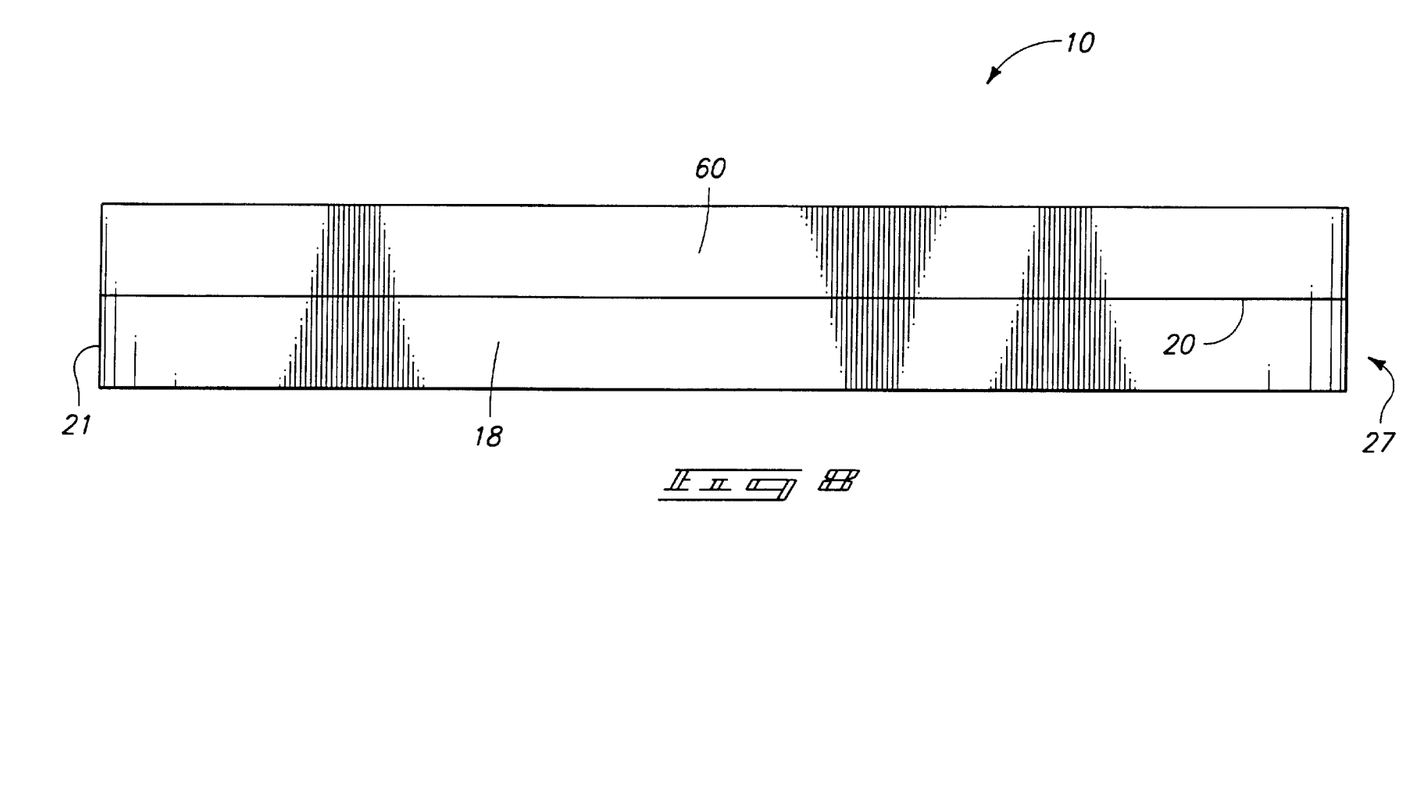
FIG. 8 is an elevational end view of a completed electronic device.

Referring to FIG. 8, an encapsulant 60, such as encapsulating epoxy material, is subsequently applied and formed to encapsulate the substrate 18. Encapsulant 60 covers power source 52, integrated circuit 54, and conductive circuitry 30 (electrical components 52, 54, and circuitry 30 are not shown in FIG. 8). Encapsulant 60 also covers a portion of the support surface 20 and defines a portion of a housing 27 for the electronic device 10. Housing 27 comprises substrate 18 in addition to the encapsulating epoxy material 60. In one embodiment, housing 27 of electronic device 10 has a width of about 3.375 inches, a height of about 2.125 inches, and a thickness less than or equal to about 0.0625 inches.

An exemplary encapsulant 60 is a flowable encapsulant. The flowable encapsulant is subsequently cured following the appropriate covering of the integrated circuit 54, power source 52, conductive circuitry 30, and support surface 20, forming a substantially void-free housing 27 or solid mass. In the illustrated embodiment, such epoxy constitutes a two-part epoxy having a resin and a hardener which are sufficient to provide a desired degree of flexible rigidity. Such encapsulation of electronic device 10 is described in U.S. patent application Ser. No. 08/800,037, filed Feb. 13, 1997, assigned to the assignee of the present application, and incorporated herein by reference.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus configured to reset an electrical device having a power supply comprising:
   plural electrodes configured for electrical engagement with plural terminals of a power supply of an electrical device;
   a switch having plural power terminals and a control terminal, the power terminals being electrically coupled with the electrodes and the control terminal being operable to receive a control signal, the switch being configured to electrically connect the power terminals and short the power supply responsive to the control signal; and
   a controller configured to generate the control signal and apply the control signal to the switch.

2. The apparatus according to claim 1 wherein the controller comprises a multivibrator.

3. The apparatus according to claim 1 further comprising an indicator operable to indicate the shorting of the power supply.

4. The apparatus according to claim 3 wherein the controller comprises a first multivibrator configured to output the control signal to momentarily short the power supply and a second multivibrator configured to apply an indication signal to the indicator responsive to the outputting of the control signal.

5. The apparatus according to claim 1 wherein the controller includes discrete components operable to control the length of time of the shorting of the power supply.

6. The apparatus according to claim 1 wherein the electrodes comprise spring-loaded electrodes.

7. The apparatus according to claim 1 wherein the switch is operable to momentarily short the power supply.

8. The apparatus according to claim 1 wherein the switch comprises a transistor.

9. A method of resetting an electrical device comprising:
providing an electrical device including a power supply and an electrical component;
providing an interconnect;
electrically coupling the power supply and the electrical component using the interconnect;
shorting the power supply of the electrical device following the coupling;
removing the short; and
applying power from the power supply to the electrical component via the interconnect.

10. The method according to claim 9 wherein the applying power comprises ramping an output of the power supply.

11. The method according to claim 10 further comprising controlling the ramping.

12. The method according to claim 9 wherein the electrically coupling comprises rendering the interconnect electrically conductive.

13. The method according to claim 12 wherein the interconnect comprises a conductive epoxy and the rendering comprises curing the conductive epoxy.

14. The method according to claim 9 further comprising indicating the shorting.

15. The method according to claim 9 further comprising controlling a length of time of the shorting.

16. The method according to claim 9 further comprising:
providing a reset device; and
electrically coupling the reset device with the power supply.

17. The method according to claim 16 wherein the shorting is responsive to the electrically coupling of the reset device.

18. The method according to claim 9 wherein the electrical component comprises an integrated circuit and the shorting resets the integrated circuit.

19. The method according to claim 9 wherein the shorting and removing comprise shorting and removing using a switch.

20. A method comprising:
providing a substrate;
supporting a power supply using the substrate;
supporting an electrical component using the substrate;
coupling the power supply and the electrical component using an interconnect;
temporarily shorting the power supply; and
applying power via the interconnect to the electrical component using the power supply.

21. The method according to claim 20 wherein the providing comprises providing a flexible substrate.

22. The method according to claim 21 wherein the applying power comprises ramping an output of the power supply.

23. The method according to claim 22 further comprising controlling the ramping.

24. The method according to claim 20 wherein the interconnect comprises a conductive adhesive.

25. The method according to claim 24 further comprising rendering the interconnect conductive.

26. The method according to claim 25 wherein the rendering comprises curing the conductive adhesive.

27. The method according to claim 20 further comprising indicating the shorting.

28. The method according to claim 20 further comprising encapsulating the substrate, power supply and electrical component.

29. The method according to claim 20 wherein the electrical component comprises an integrated circuit and the shorting resets the integrated circuit.

30. The method according to claim 20 further comprising:
providing a reset device; and
electrically coupling the reset device with the power supply.

31. The method according to claim 30 wherein the shorting is responsive to the electrically coupling of the reset device.

32. The method according to claim 20 wherein the temporarily shorting comprises shorting using a switch.

33. A method comprising:
providing a substrate;
supporting a power supply using the substrate;
coupling an electrical component with the power supply using an adhesive;
curing the adhesive;
shorting the power supply; and
conducting electricity using the cured adhesive following the shorting.

34. The method according to claim 33 wherein the conducting comprises applying electricity to the electrical component from the power supply.

35. The method according to claim 34 wherein the applying comprises ramping an output of the power supply.

36. The method according to claim 35 further comprising controlling the ramping of the output of the power supply.

37. The method according to claim 33 further comprising rendering the adhesive conductive during the curing.

38. The method according to claim 33 further comprising indicating the shorting.

39. The method according to claim 33 further comprising encapsulating the substrate, electrical component, and power supply.

40. The method according to claim 33 wherein the shorting comprises shorting the power supply for a selected period of time.

41. The method according to claim 33 wherein the electrical component comprises an integrated circuit and the shorting resets the integrated circuit.

42. The method according to claim 33 further comprising:
providing a reset device; and
electrically coupling the reset device with the power supply.

43. The method according to claim 42 wherein the shorting is responsive to the electrically coupling of the reset device.

44. The method according to claim 33 wherein the shorting comprises shorting using a switch.

45. A method comprising:
forming a conductive pattern upon a substrate;

electrically coupling an integrated circuit with the conductive pattern;

electrically coupling a power supply having a power terminal and a ground terminal with the conductive pattern;

electrically coupling a reset device with the power terminal and the ground terminal of the power supply;

shorting the power terminal and the ground terminal of the power supply using the reset device; and applying electricity to the integrated circuit following the shorting.

46. The method according to claim 45 wherein the shorting comprises connecting the power terminal and the ground terminal for a selected period of time.

47. The method according to claim 45 wherein the applying comprises ramping an output of the power supply following the shorting.

48. The method according to claim 47 further comprising controlling the ramping using the reset device.

49. The method according to claim 45 wherein the integrated circuit includes a transponder.

50. The method according to claim 45 wherein the reset device comprises a multivibrator and a transistor and electricity from the power supply is provided to an input of the multivibrator.

51. The method according to claim 50 wherein the output of the multivibrator is operable to control the transistor.

52. The method according to claim 45 wherein the reset device further comprises a plurality of discrete components selected to provide shorting of the power supply for a predetermined period of time.

53. The method according to claim 45 wherein the shorting is responsive to the coupling of the reset device with the power terminal and ground terminal of the power supply.

54. The method according to claim 45 wherein the shorting resets the integrated circuit.

55. The method according to claim 45 further comprising encapsulating the integrated circuit, power supply and at least a portion of the support surface.

56. The method according to claim 45 wherein the shorting is responsive to the electrically coupling of the reset device.

57. A method of forming a remote intelligent communication device comprising:

forming a conductive pattern upon a support surface of a flexible substrate;

electrically coupling an integrated circuit with the conductive pattern, the integrated circuit including a transponder, microprocessor and memory in cooperation with one another;

coupling a power supply having a power electrode and a ground electrode with the conductive pattern using an epoxy;

curing the epoxy providing electrical connection of the power supply with the conductive pattern;

electrically coupling a reset device with the power terminal and the ground terminal of the power supply, the reset device comprising a transistor having a control terminal coupled with a multivibrator and plural power terminals individually coupled with one of the power electrode and the ground electrode, the multivibrator being operable to apply a control signal to the control terminal of the transistor responsive to the coupling of the reset device and the power supply;

shorting the power electrode and the ground electrode of the power supply using the reset device;

resetting the integrated circuit responsive to the shorting;

applying electricity to the transponder, microprocessor, and memory following the shorting, the applying including ramping an output of the power supply;

controlling the ramping; and encapsulating the integrated circuit, power supply and at least a portion of the support surface.

* * * * *